(12) United States Patent
Vandyke

(10) Patent No.: US 7,200,982 B2
(45) Date of Patent: Apr. 10, 2007

(54) BLADE SLIPPAGE APPARATUS

(75) Inventor: George Vandyke, Sussex, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 11/100,904

(22) Filed: Apr. 7, 2005

(65) Prior Publication Data

US 2006/0010847 A1    Jan. 19, 2006

Related U.S. Application Data

(63) Continuation-in-part of application No. 10/882,374, filed on Jul. 1, 2004, now abandoned.

(51) Int. Cl.
*A01D 34/00* (2006.01)
(52) U.S. Cl. .................................................. 56/17.5
(58) Field of Classification Search ................. 56/295, 56/255, 256, 17.5, 13.6
See application file for complete search history.

(56) References Cited

U.S. PATENT DOCUMENTS

| | | |
|---|---|---|
| 2,125,270 A | 8/1938 | Conover |
| 2,235,605 A | 3/1941 | Bugatti |
| 2,539,630 A | 1/1951 | Krueger et al. |
| 2,605,850 A | 8/1952 | Kiekhaefer |
| 2,726,524 A | 12/1955 | Gorin |
| 2,803,103 A | 8/1957 | Kollman |
| 2,822,657 A | 2/1958 | Chaffee |
| 2,875,569 A * | 3/1959 | Sauer ........................... 56/295 |
| 2,974,502 A | 3/1961 | Radcliffe |
| 2,993,544 A | 7/1961 | Carlson |
| 3,044,241 A | 7/1962 | Snider |
| 3,096,106 A | 7/1963 | Wanner |
| 3,157,978 A | 11/1964 | McMullen |
| 3,256,939 A | 6/1966 | Novak |
| 3,307,634 A | 3/1967 | Bihlmire |
| 3,429,112 A | 2/1969 | Fegan et al. |
| 3,477,794 A | 11/1969 | Abbott et al. |
| 3,596,446 A | 8/1971 | Byran |
| 3,748,061 A | 7/1973 | Henrich |
| 3,788,050 A | 1/1974 | Houst et al. |
| 4,037,394 A | 7/1977 | Lindblad |
| 4,083,168 A | 4/1978 | Oscarsson |
| 4,214,426 A | 7/1980 | Lindblad |
| 4,317,324 A | 3/1982 | Malmberg et al. |
| 4,338,064 A | 7/1982 | Carmel |
| 4,414,925 A | 11/1983 | Mellin |

(Continued)

*Primary Examiner*—Árpád Fábián Kovács
(74) *Attorney, Agent, or Firm*—Michael Best & Friedrich LLP

(57) ABSTRACT

The present invention provides a slippage apparatus adapted for use with a vegetation cutting device including a blade and a prime mover having an output shaft. The slippage apparatus includes an adapter rotatable with the blade. The adapter also includes a bore defining a sidewall. The slippage apparatus also includes an insert received in the bore. The insert includes an aperture to receive the output shaft, a first radial thickness, and a second radial thickness defining a groove having a bottom surface spaced from the sidewall. The second radial thickness is less than the first radial thickness. The insert also includes a first key extending toward a central axis of the out shaft that engages a keyway in the output shaft. The first key is positioned adjacent the groove. The insert is adapted to at least partially crack at the groove when the blade strikes an object.

7 Claims, 6 Drawing Sheets

U.S. PATENT DOCUMENTS

| | | |
|---|---|---|
| 4,477,228 A | 10/1984 | Duffy et al. |
| 4,566,855 A | 1/1986 | Costabile et al. |
| 4,594,843 A | 6/1986 | Andersson et al. |
| D289,524 S | 4/1987 | Andersson et al. |
| 4,826,404 A | 5/1989 | Zwicky |
| 4,842,483 A | 6/1989 | Geary |
| 5,201,679 A | 4/1993 | Velte, Jr. et al. |
| 5,244,348 A | 9/1993 | Karls et al. |
| 5,607,023 A | 3/1997 | Palm |
| 5,715,662 A | 2/1998 | Walters |
| 5,746,298 A | 5/1998 | Krivec et al. |
| 5,908,284 A | 6/1999 | Lin |
| 6,205,755 B1 * | 3/2001 | Bontrager et al. ........... 56/17.5 |
| 6,358,008 B1 | 3/2002 | Chen |
| 6,383,042 B1 | 5/2002 | Neisen |
| 6,439,091 B1 | 8/2002 | Dibbern et al. |
| 6,471,481 B2 | 10/2002 | Chen |
| 6,524,069 B2 | 2/2003 | Chen |
| 6,718,745 B1 | 4/2004 | Adams |
| 2001/0000376 A1 | 4/2001 | Vastag |
| 2002/0157363 A1 | 10/2002 | Kraus |
| 2003/0118443 A1 | 6/2003 | Chen |

* cited by examiner

BLADE SLIPPAGE APPARATUS

RELATED APPLICATIONS

This is a continuation-in-part patent application of U.S. patent application Ser. No. 10/882,374 filed on Jul. 1, 2004 now abanoned, which is incorporated herein by reference.

FIELD OF THE INVENTION

This invention relates generally to slippage apparatus, and more particularly to slippage apparatus for use with blades in lawnmowers.

BACKGROUND OF THE INVENTION

Slippage devices are typically utilized in walk-behind lawnmowers in anticipation of the blade of the lawnmower striking or impacting a rigid object in the path of the blade. Conventional slippage devices typically utilize one or more slip plates to frictionally engage the blade, and the one or more slip plates are maintained in engagement with the blade by a bolt passing through the blade and the one or more slip plates and threadably engaging the end of the crankshaft in the lawnmower's engine. Typically, the bolt is torqued to a predetermined amount to allow slippage between the one or more slip plates and the blade if the blade were to impact a rigid object. Slippage devices like these help reduce the amount of damage done to the crankshaft during impacts with rigid objects.

SUMMARY OF THE INVENTION

The present invention provides, in one aspect, a slippage apparatus adapted for use with a vegetation cutting device including a blade and a prime mover having an output shaft. The slippage apparatus includes an adapter rotatable with the blade. The adapter also includes a bore defining a sidewall. The slippage apparatus also includes an insert received in the bore. The insert includes an aperture to receive the output shaft, a first radial thickness, and a second radial thickness defining a groove or recess having a bottom surface spaced from the sidewall. The second radial thickness is less than the first radial thickness. The insert also includes a first key extending toward a central axis of the output shaft that engages a keyway in the output shaft. The first key is positioned adjacent the groove or recess. The insert is adapted to at least partially crack near the groove or recess when the blade strikes an object.

The present invention provides, in another aspect, a slippage apparatus adapted for use with a vegetation cutting device including a blade and a prime mover having an output shaft. The slippage apparatus includes an insert having an aperture to receive the output shaft, a first key extending toward a central axis of the output shaft that engages a keyway in the output shaft, and a second key extending away from the central axis of the output shaft. The slippage apparatus also includes an adapter rotatable with the insert and the blade. The adapter includes a bore to receive the insert, a keyway to receive the second key of the insert, and a projection engageable with the blade to align the first key with a longitudinal axis of the blade. The insert is adapted to at least partially crack at a location adjacent the first key when the blade strikes an object.

The present invention provides, in yet another aspect, a vegetation cutting device including a prime mover including an output shaft having a central axis, a blade drivably coupled to the output shaft, the blade having a longitudinal axis, and a slippage apparatus drivably coupling the output shaft and the blade. The slippage apparatus includes an insert having an aperture to receive the output shaft, a first key extending toward a central axis of the output shaft that engages a keyway in the output shaft, and a second key extending away from the central axis of the output shaft. The slippage apparatus also includes an adapter rotatable with the insert and the blade. The adapter includes a bore to receive the insert, a keyway to receive the second key of the insert, and a projection engageable with the blade to align the first key with the longitudinal axis of the blade. The insert is adapted to at least partially crack at a location adjacent the first key when the blade strikes an object.

Other features and aspects of the present invention will become apparent to those skilled in the art upon review of the following detailed description, claims and drawings.

BRIEF DESCRIPTION OF THE DRAWINGS

In the drawings, wherein like reference numerals indicate like parts.

Figure 1:
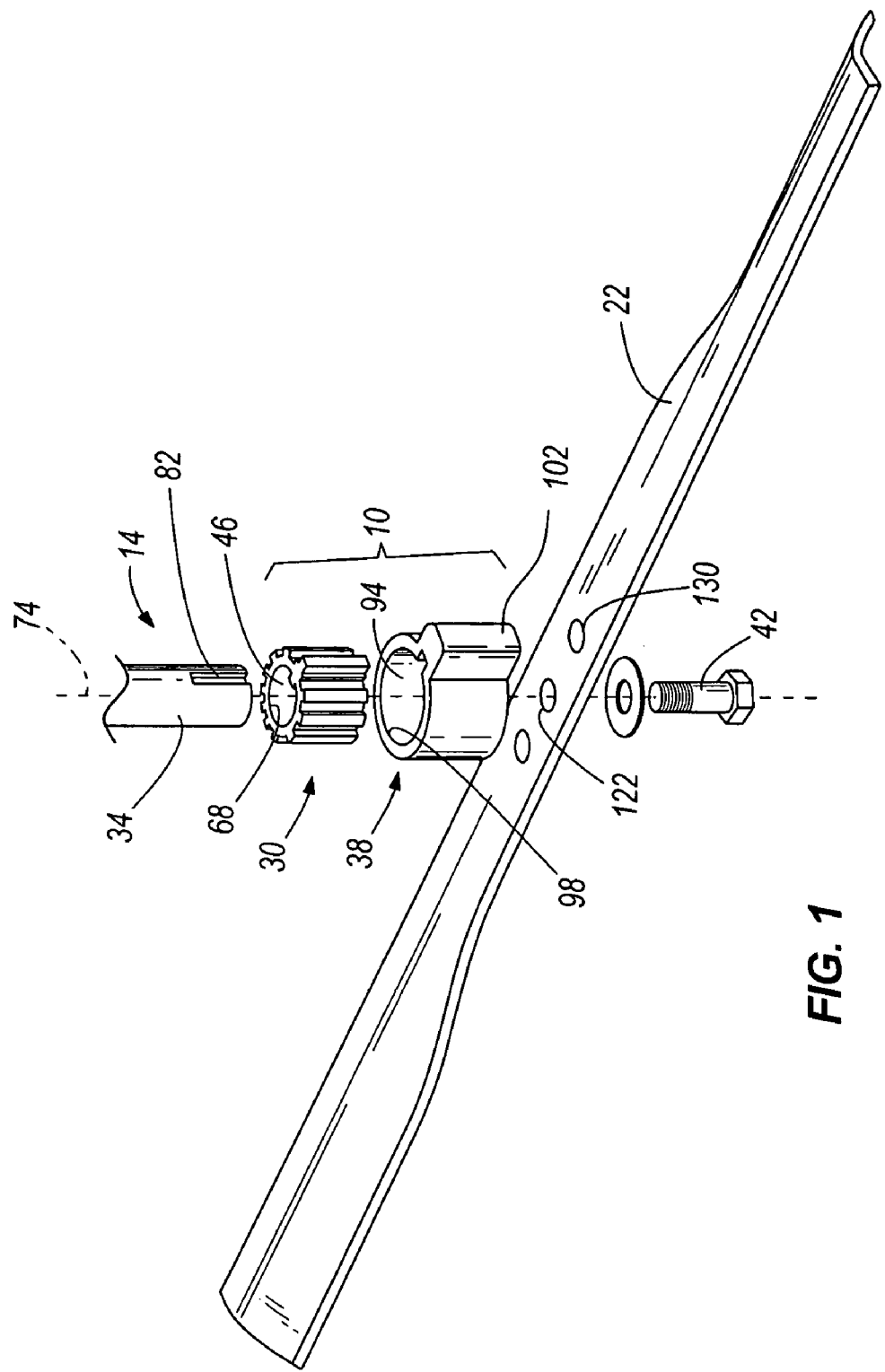
FIG. 1 is an exploded perspective view of a slippage apparatus of the present invention coupling a crankshaft of an engine and a blade of a lawnmower.

Before any features of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including", "having", and "comprising" and variations thereof herein is meant to encompass the items listed thereafter and equivalents thereof as well as additional items. The use of letters to identify elements of a method or process is simply for identification and is not meant to indicate that the elements should be performed in a particular order.

DETAILED DESCRIPTION

Figure 2:
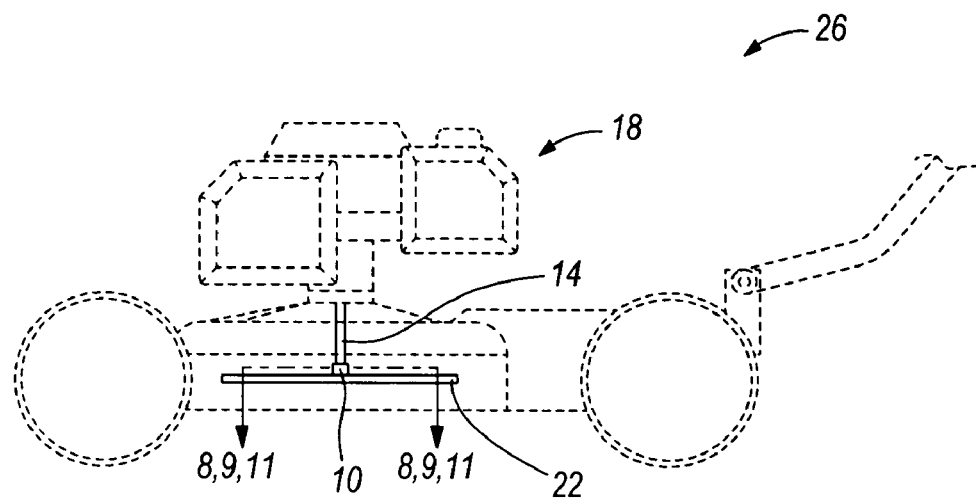
FIG. 2 is an assembled side view of the slippage apparatus of FIG. 1, schematically illustrating the engine and the lawnmower.

FIG. 1 illustrates a slippage apparatus 10 of the present invention coupled between an output shaft 14 of a prime mover 18 and a blade 22 of a vegetation cutting device 26 (see FIG. 2). More particularly, the prime mover 18 is in the form of an engine 18, the output shaft 14 is in the form of a crankshaft 14, and the vegetation cutting device 26 is in the form of a lawnmower 26. Although the prime mover 18 is illustrated as an engine 18, the prime mover 18 may also be an electric motor or any other battery-powered unit having an output shaft. Also, although the illustrated lawnmower 26 is configured as a walk-behind lawnmower 26 utilizing a vertical shaft engine 18, the slippage apparatus 10 may also be utilized with lawn tractors and other vegetation cutting devices.

As shown in FIG. 1, the slippage apparatus 10 includes an insert 30 coupled to a power take-off ("PTO") end 34 of the crankshaft 14 and an adapter 38 that receives the insert 30 and engages the blade 22. A fastener, such as a bolt 42, is passed through the blade 22, the adapter 38, and the insert 30, and is threadably engaged with the PTO end 34 of the crankshaft 14 to secure the slippage apparatus 10 and the blade 22 to the PTO end 34 of the crankshaft 14.

Figure 3:
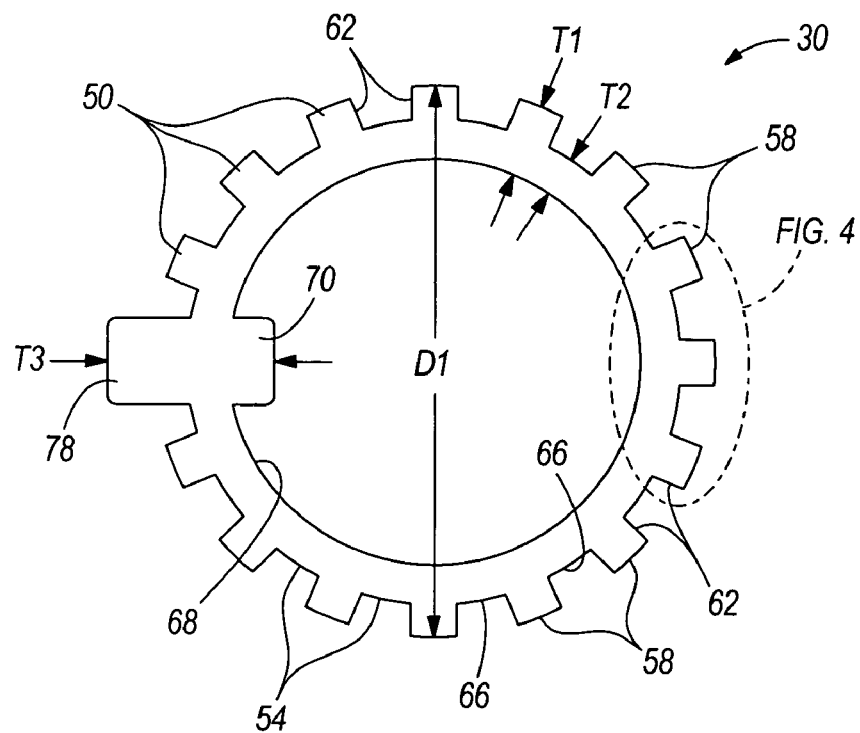
FIG. 3 is a top view of an insert of the slippage apparatus of FIG. 1.

With reference to FIG. 3, the insert 30 has a generally cylindrical shape and has an aperture 46 through which the PTO end 34 of the crankshaft 14 is received. The insert 30 may be made from at least one of a polyamide, nylon, and an olefin. Alternatively, the insert 30 may be made from another deformable material capable of absorbing impact energy between the blade 22 and a rigid object. Further, the insert 30 may include other shapes (e.g., a conical or a multi-sided shape) rather than a generally cylindrical shape, provided that the adapter 38 is appropriately configured to receive the insert 30.

Figure 4:
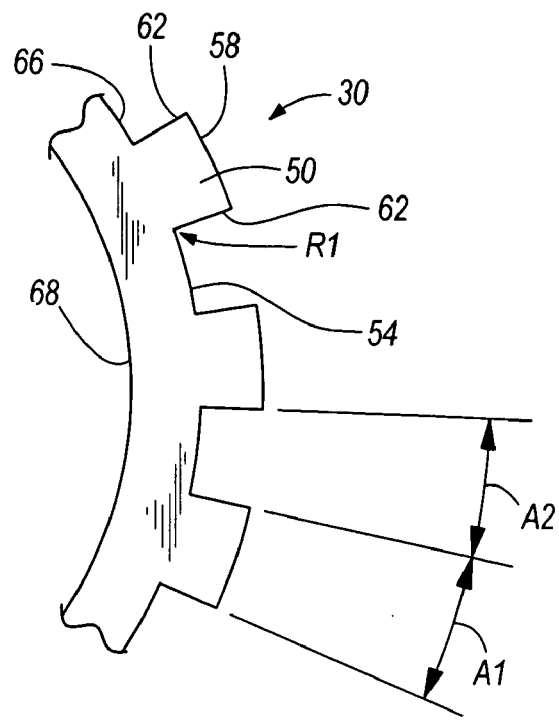
FIG. 4 is an enlarged view of a portion of the insert of FIG. 3.

The insert 30 also includes a plurality of alternately-spaced projections 50 and grooves 54 around the perimeter of the insert 30. As shown in FIG. 4, each projection 50 includes an end surface 58 and respective side surfaces 62 adjacent the end surface 58. Each groove 54 includes a bottom surface 66, and each groove 54 is further defined by opposed side surfaces 62 of adjacent projections 50.

In the illustrated construction, the respective end surfaces 58 of the projections 50 are concentric with the aperture 46 in the insert 30 and define an arc A1 of about 11.5 degrees (see FIG. 4). Alternatively, the respective end surfaces 58 may be configured to define an arc A1 between about 5 degrees and about 20 degrees. Likewise, in the illustrated construction, the respective bottom surfaces 66 of the grooves 54 are concentric with the respective end surfaces 58 of the projections 50 and define an arc A2 of about 11 degrees. Alternatively, the respective bottom surfaces 66 may be configured to define an arc A2 between about 5 degrees and about 20 degrees.

In the illustrated construction, the insert 30 includes a nominal diameter D1 (see FIG. 3) measured from end surfaces 58 of opposed projections 50. In addition, the insert 30 includes a radial thickness T1 through the projections 50 measured between an inner surface 68 of the insert 30 and the end surface 58. Thickness T1 is equal to the distance between the outer end of a projection 50 and inner surface 68. The insert 30 also includes a radial thickness T2 through the grooves 54 measured between the inner surface 68 of the insert 30 and the bottom surface 66. In the illustrated construction, thickness T2 is about one half thickness T1. Alternatively, thickness T2 may be less than one half of thickness T1, or thickness T2 may be greater than one half of thickness T1. The illustrated insert 30 includes 15 projections 50, however, alternate constructions of the insert 30 may include between about 10 to about 18 projections 50.

In alternate constructions of the insert 30, the projections 50 may be configured with different cross-sectional shapes other than those illustrated in FIG. 3. Such alternate constructions of the insert 30 may include projections 50 having trapezoidal, triangular, circular, elliptical, or any of a number of polygonal cross-sectional shapes. As such, arcs A1, A2 may be different or may not accurately describe projections 50 and grooves 54 having such different configurations.

In the illustrated construction, the insert 30 includes a radius R1 at the corner of the side surface 62 of each projection and the bottom surface 66 of each groove 54 (see FIG. 4). Such a radius R1 may be sufficiently small to facilitate shearing or tearing of the projection 50 at the corner of the side surface 62 and the bottom surface 66, which will be discussed below in greater detail.

With reference to FIG. 3, the insert 30 includes a first key 70 extending radially inwardly toward a central axis 74 of the crankshaft 14, and a second key 78 extending radially outwardly or away from the central axis 74. The first key 70 is engageable with a matching keyway 82 in the crankshaft 14 (see FIG. 1), while the second key 78 is engageable with a matching keyway 86 in the adapter 38. In the illustrated construction of FIG. 3, the first and second keys 70, 78 are aligned with a plane 90 (see FIG. 8) containing the central axis 74 of the crankshaft 14. Alternatively, the first and second keys 70, 78 may not be aligned on a common plane.

With continued reference to FIG. 3, the first and second keys 70, 78 define a radial thickness T3 of the insert 30. Thickness T3 is equal to the distance between the inner end of key 10 and the outer end of key 78. In the illustrated construction, the radial thickness T2 corresponds to the thickness of grooves 54 and is preferably about 0.2 and 0.6 times the radial thickness T3. In an alternate construction of the insert 30, the second key 78 may not be aligned with the first key 70. In such a construction, only the distance between the inner end of first key 70 and the outer surface of insert 30 would define the radial thickness T3.

With reference to FIG. 1, the adapter 38 includes a substantially cylindrical bore 94 to receive the substantially cylindrical insert 30. The bore 94 defines a sidewall 98 in the adapter 38 that is frictionally engaged by the respective end surfaces 58 of the projections 50 of the insert 30. In the illustrated construction, about 50 percent of the surface area of the sidewall 98 is frictionally engaged by the respective end surfaces 58 of the projections 50. Alternatively, between about 30 percent to about 60 percent of the surface area of the sidewall 98 may be frictionally engaged by the respective end surfaces 58 of the projections 50. The number and size of projections 50 utilized to engage between about 30 percent to about 60 percent of the surface area of the sidewall 98 may be selected to allow sufficient spacing between adjacent projections 50 for the projections 50 to deflect into an adjacent groove 54 without contacting an adjacent projection 50.

The bore 94 includes a nominal diameter D2 which is substantially the same as the nominal diameter D1 of the insert 30. Such dimensions D1, D2 provide "line on line," or more accurately, nearly ideal surface-to-surface contact between the respective end surfaces 58 of the projections 50 and the sidewall 98, such that the projections 50 are not substantially pre-loaded or compressed.

Figure 5:
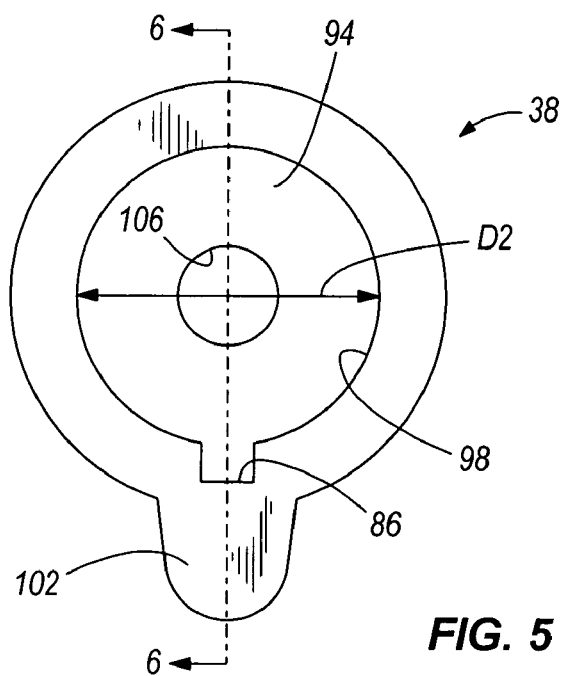
FIG. 5 is a top view of an adapter of the slippage apparatus of FIG. 1.

With continued reference to FIG. 1, and as also shown in FIG. 5, the adapter 38 includes a radially-extending projection 102 aligned with the keyway 86 in the adapter 38. The projection 102 provides additional strength to the adapter 38 in a location where material is removed in forming the keyway 86. The adapter 38 also includes an aperture 106 through which the bolt 42 is inserted in coupling the slippage apparatus 10 to the PTO end 34 of the crankshaft 14.

Figure 6:
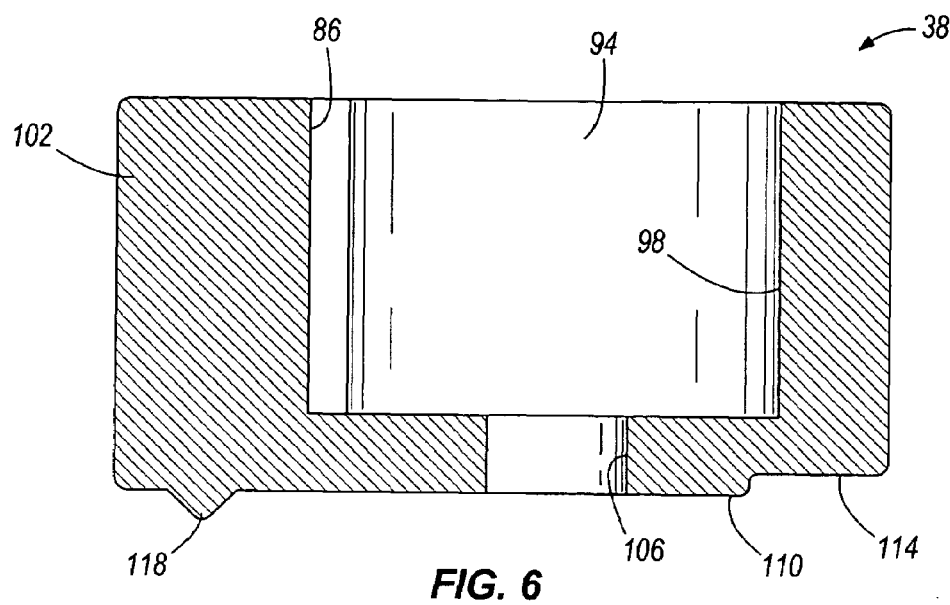
FIG. 6 is a cross-sectional view of the adapter of FIG. 5 through section 6—6.
Figure 7:
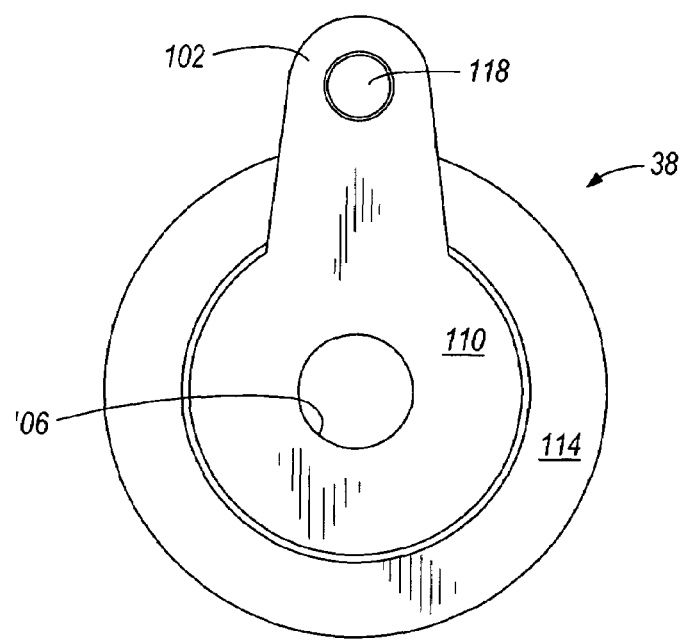
FIG. 7 is a bottom view of the adapter of FIG. 5.

With reference to FIGS. 6 and 7, the adapter 38 includes a first surface 110 frictionally engaged with the blade 22 and a second surface 114 spaced from the blade 22 and in substantially facing relationship with the blade 22. By spacing the second surface 114 from the blade 22, less of the adapter 38 may be in frictional contact with the blade 22. In the illustrated construction, the area of the first surface 110 occupies between about 20 percent and about 60 percent of the total surface area of the adapter 38 facing the blade 22 (i.e., the sum of the areas of the first surface 110 and the second surface 114). As such, less friction may be developed between the adapter 38 and the blade 22 compared to a design in which, for example, the first and second surfaces 110, 114 frictionally engage the blade 22.

In the illustrated construction, the first surface 110, or the surface of the adapter 38 in frictional contact with the blade 22, is located radially inwardly of the second surface 114 with respect to the axis of rotation, or the surface of the adapter 38 not in frictional contact with the blade 22. Alternatively, the second surface 114 may be in frictional contact with the blade 22, and the first surface 110 may be spaced from the blade 22. Further, separate slip plates (not shown) may be positioned between the adapter 38 and the blade 22 to decrease frictional forces.

As shown in FIG. 6, the adapter 38 includes a bump or a projection 118 extending from the first surface 110 in a location radially offset from the central axis 74. The projection 118 aligns the adapter 38 with the blade 22.

Figure 10:
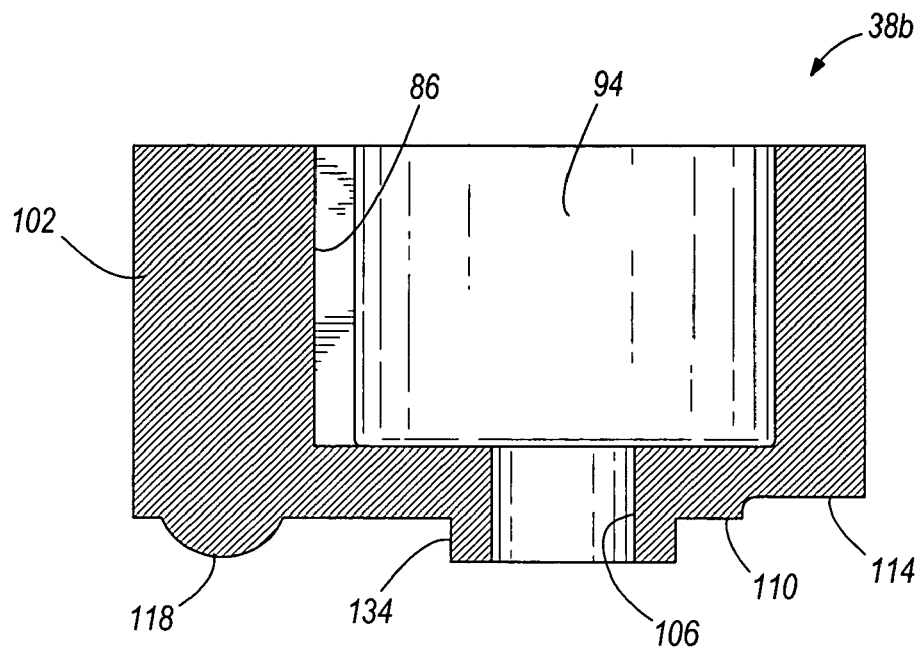
FIG. 10 is a cross-sectional view of a second construction of an adapter of the slippage apparatus according to the present invention.

With reference to FIG. 10, a second construction of the adapter 38b may include a boss 134 extending from the first surface 110 to provide additional support to the bolt 42 that is inserted through the aperture 106. Other numbered features of the adapter 38b are substantially similar to the same numbered features of the adapter 38, and will not be discussed again in detail. Either construction of the adapter 38, 38b may be used in the slippage apparatus 10, however, only the adapter 38 will be discussed with respect to the assembly and operation of the slippage apparatus 10.

With reference to FIG. 1, the insert 30, adapter 38, and blade 22 are assembled such that the first key 70 of the insert 30 engages the keyway 82 in the PTO end 34 of the crankshaft 14, and the second key 78 of the insert 30 engages the keyway 86 in the adapter 38. The bolt 42 may be inserted through a central aperture 122 in the blade 22 and the aperture 106 in the adapter 38, and threadably engaged with the PTO end 34 of the crankshaft 14.

In a construction of the slippage apparatus 10 utilizing the adapter 38b of FIG. 10, the aperture 122 in the blade 22 is sized appropriately to receive the boss 134 of the adapter 38b. As previously stated, the boss 134 provides additional support to the bolt 42 in the aperture 106. When the boss 134 is inserted into the aperture 122 in the blade, the bolt 42 is substantially insulated from shear forces acting on the boss 134 when the blade 22 impacts a large, rigid, substantially stationary object. As such, a decreased amount of shear force is transferred through the bolt 42 when the blade 22 impacts the stationary object.

The bolt 42 may be torqued between about 360 in-lbs. and about 720 in-lbs. to secure the slippage apparatus 10 and the blade 22 to the PTO end 34 of the crankshaft 14. The interaction between the insert 30 and the adapter 38 and the interaction between the adapter 38 and the blade 22, which will be discussed in more detail below, does not require the bolt 42 to be torqued to a specific torque value or even a narrow range of torque values, as long as a minimum torque value exists. As such, the slippage apparatus 10 and the blade 22 may be assembled to the PTO end 34 of the crankshaft 14 without performing additional steps or assembly processes to accurately torque the bolt 42 or to verify the torque setting of the bolt 42.

In the illustrated construction, the insert 30, adapter 38, and blade 22 are assembled such that the first key 70 of the insert 30 and the keyway 82 in the PTO end 34 of the crankshaft 14 are aligned with the plane 90 containing the central axis 74 and a longitudinal axis 126 of the blade 22. Also, the second key 78 of the insert 30 and the keyway 86 in the adapter 38 are aligned with the plane 90 containing the central axis 74 and the longitudinal axis 126 of the blade 22. Alternatively, the second key 78 and the keyway 86 in the adapter 38 may not be aligned with the plane 90 containing the central axis 74 and the longitudinal axis 126 of the blade 22.

The bump or projection 118 extending from the first surface 110 of the adapter 38 is at least partially insertable into an aperture 130 in the blade 22 spaced from the central axis 74, or the rotational axis of the blade 22. The projection 118 and the aperture 130 are also aligned with the plane 90 containing the central axis 74 and the longitudinal axis 126 of the blade 22.

Figure 8:
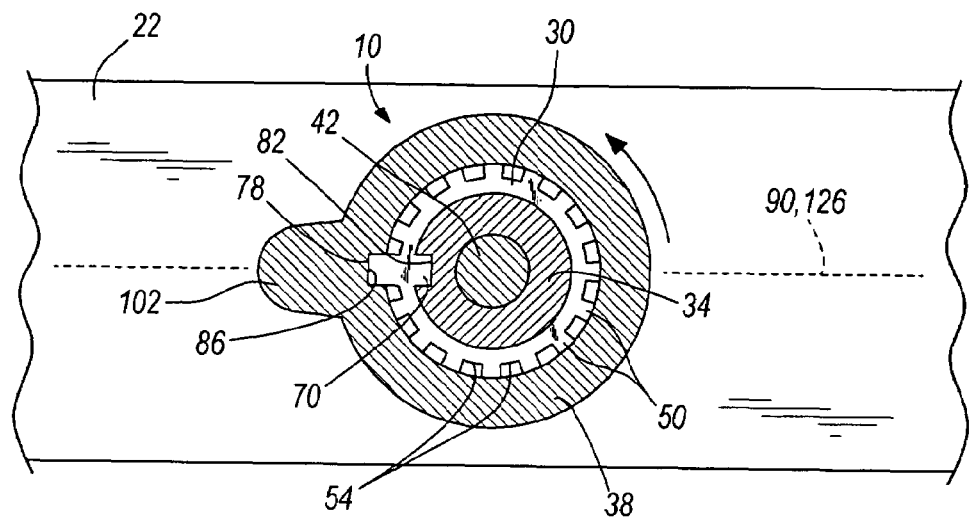
FIG. 8 is an assembled, cross-sectional view of the slippage apparatus of FIG. 1 through section 8—8 in FIG. 2, illustrating normal operation of the slippage apparatus and the blade.
Figure 9:
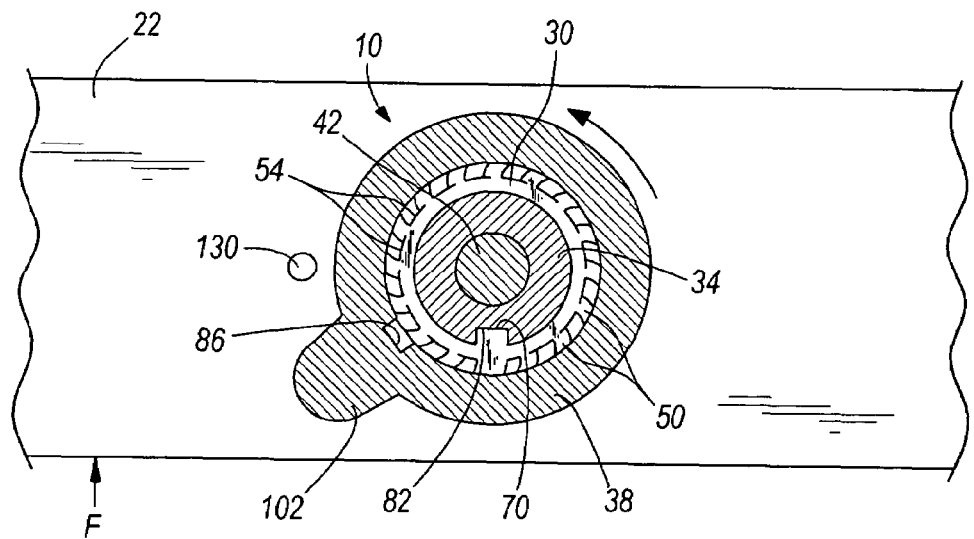
FIG. 9 is another assembled, cross-sectional view of the slippage apparatus of FIG. 1 through section 9—9 in FIG. 2, illustrating the slippage apparatus de-coupling the blade from the torque of the crankshaft when a rigid object is struck by the blade.

With reference to FIGS. 8 and 9, an impact may be represented by force F acting against the blade 22. Not only does the force F impart a moment or a torque on the PTO end 34 of the crankshaft 14, but the force F also imparts a bending load on the PTO end 34 of the crankshaft 14. By aligning the keyway 82 in the PTO end 34 of the crankshaft 14, the first key 70 of the insert 30, and the blade 22 in a common plane 90 (i.e., the plane 90 containing the central axis 74 and the longitudinal axis 126 of the blade 22), stress in the PTO end 34 of the crankshaft 14 is substantially decreased when the blade 22 impacts a rigid object. This is due to the keyway 82 being aligned with a neutral axis (corresponding with the central axis 74) of the PTO end 34 of the crankshaft 14 as the PTO end 34 is subject to the bending component of force F. Such decreased levels of stress on the PTO end 34 of the crankshaft 14 may yield a decreased amount of damage or permanent deformation done to the crankshaft 14 upon impacting a large, rigid, substantially stationary object.

With continued reference to FIG. 9, after impacting a large, rigid, substantially stationary object (represented by force F), the slippage apparatus 10 substantially de-couples the blade 22 and the PTO end 34 of the crankshaft 14 to decrease the amount of damage' done to the crankshaft 14. More particularly, the apparatus 10 allows slippage between the insert 30 and the adapter 38, and slippage between the adapter 38 and the blade 22. The apparatus 10 may also allow slippage between the PTO end 34 of the crankshaft 14 and the insert 30. Although slippage between the insert 30 and the adapter 38, and slippage between the adapter 38 and the blade 22 is shown in the illustrated construction of FIG. 9, other blade impacts with smaller rigid objects may only cause slippage of the insert 30 relative to the adapter 38, or slippage of the adapter 38 relative to the blade 22. In other words, slippage between the insert 30 and the adapter 38, and slippage between the adapter 38 and the blade 22 are independent from each other, and may occur concurrently or at different times. Also, after the blade 22 impacts a rigid object, slippage between the adapter 38 and the blade 22 may occur before, after, or concurrently with slippage between the insert 30 and the adapter 38.

As shown in FIG. 9, slippage of the insert 30 relative to the adapter 38 may occur upon the blade 22 impacting a rigid object. Specifically, after impact, the second key 78 of the insert 30 may shear, and continued rotation of the PTO end 34 of the crankshaft 14 may cause the respective end surfaces 58 of the projections 50 to frictionally engage or grip the sidewall 98 of the adapter 38 to cause the projections 50 to deform, deflect, shear, or tear, thereby substantially absorbing the energy of the impact. More particularly, the grooves 54 are appropriately sized such that the projections 50 may be deflected into the grooves 54 without contacting an adjacent projection 50.

Continued deflection of the projections 50 into the grooves 54 may cause the projections 50 to tear or shear at the corners of the respective side surfaces 62 and bottom surfaces 66. The corners are configured with a radius R1 small enough to impart a relatively high stress concentration factor at the corners. Such a stress concentration factor may be sufficient to cause the projections 50 to fail by tearing at the corners. Although FIG. 9 illustrates the projections 50 being only partially torn, more severe impacts may cause the projections 50 to completely tear from the insert 30.

By deforming and potentially tearing, the projections 50 behave as energy-absorbing members to absorb the energy associated with the blade 22 impacting a rigid object. Compared to a conventional lawnmower not utilizing the slippage apparatus 10, in which the crankshaft substantially absorbs the impact energy, only a small portion of the impact energy may be transmitted through the insert 30 to the crankshaft 14, potentially yielding a decreased amount of damage or permanent deformation done to the crankshaft 14.

FIG. 9 also illustrates slippage of the adapter 38 relative to the blade 22, which may occur upon the blade 22 impacting a rigid object. Specifically, after impact, the projection 118 may disengage the aperture 130 in the blade 22, forcing the adapter 38 to skew relative to the central axis 74 and at least partially compress the insert 30. After the projection 118 disengages the aperture 130, the first surface 110 may slip relative to the blade 22. Since only a small portion of the adapter 38 (i.e., the first surface 110) is in frictional contact with the blade 22, less friction may be developed between the adapter 38 and the blade 22 compared to conventional slippage apparatus. As such, the adapter 38 may be more prone to slip after blade impact, potentially yielding a decreased amount of damage done to the crankshaft 14.

Figure 11:
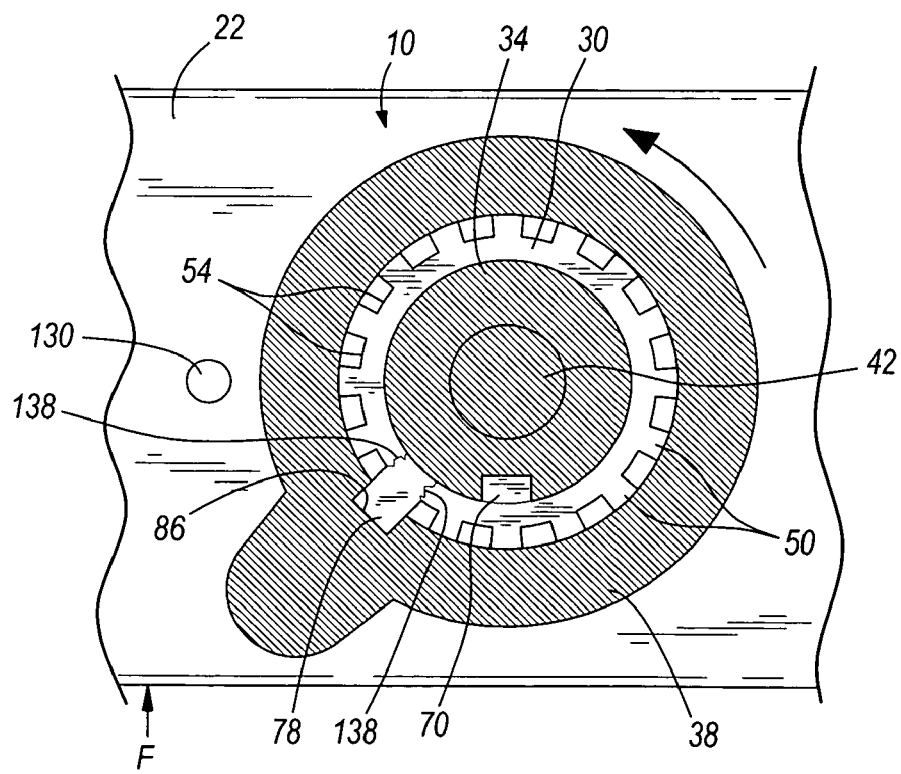
FIG. 11 is an assembled, cross-sectional view of the slippage apparatus through section 11—11 in FIG. 2, illustrating the slippage apparatus de-coupling the blade from the torque of the crankshaft when a rigid object is struck by the blade.

With reference to FIG. 11, slippage between the PTO end 34 of the crankshaft 14 and the insert 30 may also occur after the blade 22 impacts a rigid object, rather than the insert 30 slipping( relative to the adapter 38. In such an instance, the thickness T2 of the grooves 54 adjacent the first key 70 may be sized relative to the thicknesses T1 or T3 of the insert 30 to facilitate cracking in at least one of the grooves 54 adjacent the first key 70.

Upon the blade 22 impacting a large, rigid, substantially stationary object (represented by force F), tile first key 70 may at least partially shear from the insert 30 to allow slippage between tile PTO end 34 of the crankshaft 14 and the insert 30. The forces acting on the first key 70 to shear it from the insert 30 may also act on the grooves 54 adjacent the first key 70 to form cracks 138. Depending on the magnitude of impact energy absorbed by the insert 30, the insert 30 may break completely along one or both of the cracks 138. Although FIG. 11 illustrates cracks 138 forming near grooves 54 on both sides of the first key 70, the insert 30 may crack near only one of the grooves 54.

The cracks 138 facilitate slippage between the PTO end 34 of the crankshaft 14 and the insert 30 by decreasing the frictional contact between the PTO end 34 of the crankshaft 14 and the insert 30. The cracks 138 allow the insert 30 to stretch along its circumference, thereby decreasing the insert's "grip" on the PTO end 34 of the crankshaft 14. If the insert 30 breaks completely along the cracks 138, the PTO end 34 of tile crankshaft 14 may spin freely with respect to the insert 30.

The cracks 138 also facilitate slippage between the adapter 38 and the blade 22 by reducing the force required to compress the insert 30 when the adapter 38 skews relative to the central axis 74 as a result of the projection 118 disengaging the aperture 130 in the blade 22. As such, the adapter 38 may be more prone to slip relative to the blade 22 when the blade 22 impacts a solid, stationary object, potentially yielding a decreased amount of damage done to the crankshaft 14.

Various features and aspects of the present invention are set forth in the following claims.

I claim:

1. A vegetation cutting device comprising:
   a prime mover including an output shaft having a central axis;
   a blade drivably coupled to the output shaft, the blade having a longitudinal axis; and
   a slippage apparatus drivably coupling the output shaft and the blade, the slippage apparatus including
      an insert including
         an aperture to receive the output shaft;
         a first key extending toward a central axis of the output shaft that engages a keyway in the output shaft;
         a second key extending away from the central axis of the output shaft;
      an adapter rotatable with the insert and the blade, the adapter including
         a bore to receive the insert;
         a keyway to receive the second key of the insert; and
         a projection engageable with the blade to align the first key with the longitudinal axis of the blade;
   wherein the insert is adapted to at least partially crack at a location adjacent the first key when the blade strikes an object.

2. The vegetation cutting device of claim 1, wherein the longitudinal axis of the blade and the projection are aligned.

3. The vegetation cutting device of claim 1, wherein the insert includes
   a first radial thickness; and
   a second radial thickness defining a groove adjacent the first key, the groove having a bottom surface spaced from the sidewall,
   wherein the second radial thickness is less than the first radial thickness, and wherein the insert is adapted to at least partially crack near the groove when the blade strikes an object.

4. The vegetation cutting device of claim 3, wherein the second radial thickness is between about 0.2 and 0.6 times the first radial thickness.

5. The vegetation cutting device of claim 1, wherein the first key and the second key are aligned.

6. The vegetation cutting device of claim 1, wherein the adapter includes
a first surface engaging the blade; and
a second surface spaced from the blade and in substantially facing relationship with the blade.

7. The vegetation cutting device of claim 1, wherein the insert includes a plurality of spaced projections, the projections having respective end surfaces engaging the sidewall of the adapter.

* * * * *